US012575488B2

(12) United States Patent
Takahashi et al.

(10) Patent No.: US 12,575,488 B2
(45) Date of Patent: Mar. 17, 2026

(54) AUTONOMOUS LAWN MOWING SYSTEM

(71) Applicant: HONDA MOTOR CO., LTD., Tokyo (JP)

(72) Inventors: Hiroto Takahashi, Saitama (JP); Makoto Yamamura, Saitama (JP); Toru Kawai, Saitama (JP); Naoki Kameyama, Saitama (JP); Masaya Honji, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 18/550,684

(22) PCT Filed: Mar. 16, 2021

(86) PCT No.: PCT/JP2021/010614
§ 371 (c)(1),
(2) Date: Sep. 15, 2023

(87) PCT Pub. No.: WO2022/195721
PCT Pub. Date: Sep. 22, 2022

(65) Prior Publication Data
US 2024/0155974 A1 May 16, 2024

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .. A01D 34/008; A01D 2101/00; G05D 1/617; G05D 2105/15; G05D 2107/23; G05D 2109/10; G05D 1/6486
See application file for complete search history.

(56) References Cited

U.S. PATENT DOCUMENTS

| 5,204,814 A | 4/1993 | Noonan et al. |
| 2017/0020064 A1 | 1/2017 | Doughty et al. |
| (Continued) | | |

FOREIGN PATENT DOCUMENTS

| CN | 110786131 A | * | 2/2020 | ............. A01D 67/00 |
| DE | 60304846 T2 | | 9/2006 | |
| (Continued) | | | | |

OTHER PUBLICATIONS

Office Action issued Jun. 6, 2025 in the DE Patent Application No. 112021007280.3.

*Primary Examiner* — Donald J Wallace
(74) *Attorney, Agent, or Firm* — CKC & Partners Co., LLC

(57) ABSTRACT

Provided is an autonomous lawn mowing system having improved safety. An autonomous lawn mowing system 1 is provided with: a position-information acquisition unit 14 that acquires position information concerning the position of an autonomous lawn mower 2 that is capable of travelling by itself; a moisture-information acquisition unit 15 that acquires moisture information concerning the moisture content of turf; a wet-ground identification unit 31 that identifies a wet region on the basis of the position information and the moisture information; and a control module 34 that controls the autonomous lawn mower 2 on the basis of the result identified by the wet-ground identification unit 31.

11 Claims, 5 Drawing Sheets

(56)                    References Cited

U.S. PATENT DOCUMENTS

| | | | |
|---|---|---|---|
| 2019/0129435 A1 * | 5/2019 | Madsen | B62D 6/001 |
| 2019/0313571 A1 | 10/2019 | Yale et al. | |
| 2020/0233413 A1 | 7/2020 | Einecke et al. | |
| 2020/0375097 A1 | 12/2020 | Coleman | |
| 2021/0191764 A1 * | 6/2021 | Dalfra | H04L 12/2818 |
| 2021/0232146 A1 | 7/2021 | Muro et al. | |
| 2021/0368674 A1 * | 12/2021 | Eliasson | G05D 1/0274 |
| 2021/0382476 A1 * | 12/2021 | Morrison | G06Q 10/047 |

FOREIGN PATENT DOCUMENTS

| | | |
|---|---|---|
| EP | 1488296 B1 | 4/2006 |
| JP | 2000219490 A | 8/2000 |
| JP | 3632926 B2 | 3/2005 |
| JP | 2019088217 A | 6/2019 |
| JP | 2020129363 A | 8/2020 |
| WO | 2016108104 A1 | 7/2016 |
| WO | 2020090039 A1 | 5/2020 |

* cited by examiner

FIG. 3

| CLASSIFICATION | SIZE | WITH/WITHOUT BLADE | TRAVELING SPEED | TOTAL SCORE |
|---|---|---|---|---|
| LARGE-SIZE AUTONOMOUS LAWN MOWER | 3 | 1 | 3 | 7 |
| SMALL-SIZE AUTONOMOUS LAWN MOWER | 1 | 1 | 1 | 3 |
| MANUAL LAWN MOWER | 1 | 1 | 1 | 3 |
| MANUAL BLOWER | 1 | 0 | 1 | 2 |

FIG. 5

```
                    ┌─────────────┐
                    │    START    │
                    └─────────────┘
                           │
                           ▼
        ┌──────────────────────────────────┐
        │  WET LAND AREA IDENTIFICATION     │ ～ S1
        │              STEP                 │
        └──────────────────────────────────┘
                           │
                           ▼
        ┌──────────────────────────────────┐
        │   SLOPE IDENTIFICATION STEP       │ ～ S2
        └──────────────────────────────────┘
                           │
                           ▼
        ┌──────────────────────────────────┐
        │         CONTROL STEP              │ ～ S3
        └──────────────────────────────────┘
                           │
                           ▼
                    ┌─────────────┐
                    │     END     │
                    └─────────────┘
```

AUTONOMOUS LAWN MOWING SYSTEM

TECHNICAL FIELD

The present invention relates to an autonomous lawn mowing system.

BACKGROUND ART

In the related art, there is known a system that performs lawn mowing work with a lawn mower that moves autonomously (see, for example, Patent Document 1). According to this system, it is possible to identify an obstacle, search for an area where mowing is to be performed, decide travel order, and estimate a boundary of the area where mowing is to be performed, without requiring manual intervention.

Patent Document 1: Japanese Patent No. 3632926

DISCLOSURE OF THE INVENTION

Problems to be Solved by the Invention

There is, however, a possibility that an autonomous lawn mower slips, for example, when grass is wet. Therefore, an autonomous lawn mowing system with improved safety is required.

The present invention has been made in view of the above subject, and an object is to provide an autonomous lawn mowing system with improved safety.

Means for Solving the Problems (1) An autonomous lawn mowing system (for example, an autonomous lawn mowing system 1 to be described below) according to the present invention includes: a position information acquirer (for example, a GPS receiver 14 to be described below) that acquires position information about a position of a self-propelled autonomous lawn mower (for example, an autonomous lawn mower 2 to be described below); a moisture information acquirer (for example, a camera 15 to be described below) that acquires moisture information about a moisture content of a lawn; a wet land area identifier (for example, a wet land area identifier 31 to be described below) that identifies a wet land area based on the position information and the moisture information; and a controller (for example, a controller 34 to be described below) that controls the autonomous lawn mower based on a result identified by the wet land area identifier.

According to the autonomous lawn mowing system according to the invention of (1), it is possible to control the autonomous lawn mower according to whether an area is a wet land area or not. Thereby, according to the autonomous lawn mowing system according to the invention of (1), it is possible to avoid the possibility of the autonomous lawn mower slipping, for example, when grass is wet, and move the autonomous lawn mower safely.

(2) The autonomous lawn mowing system of (1) may include: a slope information acquirer (for example, an acceleration sensor 16 to be described below) that acquires slope information about a slope angle of the lawn; and a sloped area identifier (for example, a sloped area identifier 32 to be described below) that identifies a sloped area with a slope angle equal to or more than a predetermined value, based on the position information and the slope information; and the controller may control the autonomous lawn mower based on a result identified by the sloped area identifier.

According to the autonomous lawn mowing system according to the invention of (2), it is possible to control the autonomous lawn mower according to whether an area is a sloped area or not in addition to whether the area is a wet land area or not. Thereby, according to the autonomous lawn mowing system according to the invention of (2), it is possible to avoid the possibility of the autonomous lawn mower slipping, for example, when grass is wet in a sloped area, and move the autonomous lawn mower safely.

(3) In the autonomous lawn mowing system of (2), the controller may prohibit the autonomous lawn mower from traveling in an area that is included in both the wet land area and the sloped area.

According to the autonomous lawn mowing system according to the invention of (3), it is possible to prohibit the autonomous lawn mower from traveling in an area that is a sloped area in a wet land area. Thereby, according to the autonomous lawn mowing system according to the invention of (3), it is possible to move the autonomous lawn mower more safely.

(4) In the autonomous lawn mowing system of (2) or (3), the controller may allow the autonomous lawn mower to travel in an area that is included in the wet land area but is not included in the sloped area.

According to the autonomous lawn mowing system according to the invention of (4), it is possible to allow the autonomous lawn mower to travel in an area that is not a sloped area in a wet land area. Thereby, according to the autonomous lawn mowing system according to the invention of (4), it is possible to move the autonomous lawn mower more certainly and safely while avoiding the possibility of the autonomous lawn mower slipping when grass is wet in the sloped area.

(5) In the autonomous lawn mowing system of (1) or (2), the controller may prohibit the autonomous lawn mower from traveling in an entire area of the wet land area.

According to the autonomous lawn mowing system according to the invention of (5), it is possible to prohibit the autonomous lawn mower from traveling in the entire area of the wet land area. Thereby, according to the autonomous lawn mowing system according to the invention of (5), it is possible to avoid the possibility of the autonomous lawn mower slipping in the wet land area more certainly.

(6) The autonomous lawn mowing system of any of (1) to (4) may include a transmitter (for example, a communicator 25 to be described below) that transmits wet land area information that is the result identified by the wet land area identifier, to a user terminal.

According to the autonomous lawn mowing system according to the invention of (6), it is possible to notify a user of a wet land area on a lawn. Thereby, according to the autonomous lawn mowing system according to the invention of (6), it is possible to prompt the user to perform work by a manual lawn mower in the wet land area.

(7) In the autonomous lawn mowing system of (6), the user terminal may include: a map information acquirer (for example, a map information acquirer 57 to be described below) that acquires map information about a map of the lawn; a receiver (for example, a communicator 56 to be described below) that receives the wet land area information; and a display unit (for example, a display 55 to be described below) that displays the map of the lawn based on the map information and displays an area where the autonomous lawn mower is prohibited from traveling, superimposing the area on the map of the lawn in such a manner that the area is distinguishable from other areas, the area being included in the wet land area information.

According to the autonomous lawn mowing system according to the invention of (7), it is possible to visually notify the user of an area where it is impossible to perform work with the autonomous lawn mower. Thereby, according to the autonomous lawn mowing system according to the invention of (7), it is possible to prompt the user to perform work by a manual lawn mower in the area where it is impossible to perform work with the autonomous lawn mower.

(8) The autonomous lawn mowing system of (7) may include: a travel history storage (for example, a travel history storage 41 to be described below) that stores a travel history of the autonomous lawn mower in association with the position information; and a traveled wet land area part identifier (for example, a traveled wet land area part identifier 33 to be described below) that identifies a traveled wet land area part that is an area included in the wet land area and is an area where the autonomous lawn mower has traveled, based on the wet land area information and information stored in the travel history storage; the transmitter may transmit information about the traveled wet land area part to the user terminal; the receiver may receive the information about the traveled wet land area part; and the display unit may display the traveled wet land area part, superimposing the traveled wet land area part on the map of the lawn in such a manner that the traveled wet land area part is distinguishable from other areas.

According to the autonomous lawn mowing system according to the invention of (8), it is possible to visually notify the user of the traveled wet land area part where grass mowed by the autonomous lawn mower may be left as wet clumps. Thereby, according to the autonomous lawn mowing system according to the invention of (8), it is possible to prompt the user to perform work by a manual blower in the traveled wet land area part.

(9) In the autonomous lawn mowing system of any of (1) to (8), the moisture information acquirer may be a camera that photographs the lawn; and the wet land area identifier may identify the wet land area by machine learning of an image photographed by the camera.

According to the autonomous lawn mowing system according to the invention of (9), it is possible to, by performing machine learning with a plurality of images of the lawn photographed by the camera as input images, acquire moisture information about a moisture content of the lawn certainly and accurately.

(10) In the autonomous lawn mowing system of any of (1) to (8), the moisture information acquirer may be a humidity sensor provided in the autonomous lawn mower.

According to the autonomous lawn mowing system according to the invention of (10), it is possible to acquire moisture information about a moisture content of the lawn directly and easily from a detection result of the humidity sensor provided in the autonomous lawn mower.

(11) In the autonomous lawn mowing system of any of (1) to (8), the moisture information acquirer may be a plurality of humidity sensors installed on the lawn.

According to the autonomous lawn mowing system according to the invention of (11), it is possible to acquire moisture information about a moisture content of the lawn directly and easily from detection results of the plurality of humidity sensors installed on the lawn.

(12) The autonomous lawn mowing system of any of (1) to (11) may include a score storage (for example, a score storage 42 to be described below) that stores scores indicating characteristics of each of working machines that perform work on the lawn, including the autonomous lawn mower, as an information table; and the controller may control the autonomous lawn mower based on the scores stored in the score storage.

According to the autonomous lawn mowing system according to the invention of (12), it is possible to perform control of the autonomous lawn mower according to the scores indicating characteristics of each of working machines including the autonomous lawn mower. Thereby, according to the autonomous lawn mowing system according to the invention of (12), it is possible to move the autonomous lawn mower more certainly and safely.

(13) In the autonomous lawn mowing system of (2), the autonomous lawn mower may include a large-size autonomous lawn mower that is relatively large and a small-size autonomous lawn mower that is relatively small; and, when the autonomous lawn mower is the large-size autonomous lawn mower, the controller may prohibit the large-size autonomous lawn mower from traveling in an area that is included in both the wet land area and the sloped area.

According to the autonomous lawn mowing system according to the invention of (13), it is possible to prohibit the large-size autonomous lawn mower from traveling in an area that is a sloped area in a wet land area. Thereby, according to the autonomous lawn mowing system according to the invention of (13), even in a case where both of the large-size autonomous lawn mower and the small-size autonomous lawn mower are provided, it is possible to move the autonomous lawn mower more certainly and safely.

(14) In the autonomous lawn mowing system of (13), the controller may allow the small-size autonomous lawn mower to travel in an area that is included in the wet land area but is not included in the sloped area.

According to the autonomous lawn mowing system according to the invention of (14), it is possible to allow the small-size autonomous lawn mower to travel in an area that is not a sloped area in a wet land area. Thereby, according to the autonomous lawn mowing system according to the invention of (14), it is possible to move the small-size autonomous lawn mower safely in an area that is not a sloped area in a wet land area and make the work more efficient.

(15) According to the autonomous lawn mowing system of (2), the autonomous lawn mower may include a large-size autonomous lawn mower that is relatively large and a small-size autonomous lawn mower that is relatively small; and, when the autonomous lawn mower is the large-size autonomous lawn mower, the controller may prohibit the large-size autonomous lawn mower from traveling in an entire area of the wet land area.

According to the autonomous lawn mowing system according to the invention of (15), it is possible to prohibit the large-size autonomous lawn mower from traveling in the entire area of the wet land area. Thereby, according to the autonomous lawn mowing system according to the invention of (15), it is possible to avoid the possibility of the large-size autonomous lawn mower slipping in the wet land area more certainly.

(16) The autonomous lawn mowing system of any of (1) to (15) may include: a slope information acquirer that acquires slope information about a slope angle of the lawn; and a slope information accumulator (for example, a slope information accumulator 43 to be described below) that accumulates the slope information in association with the position information; and the controller may control the autonomous lawn mower based on information accumulated in the slope information accumulator.

According to the autonomous lawn mowing system according to the invention of (16), it is possible to control the autonomous lawn mower based on the slope information associated with the position information. Thereby, according to the autonomous lawn mowing system according to the invention of (13), it is possible to cause work to be performed for an area with a small slope angle first and cause work to be performed for an area with a large slope angle later, so that it is possible to move the autonomous lawn mower more safely.

(17) In the autonomous lawn mowing system of (16), the controller may cause the autonomous lawn mower to travel in an area that is not included in the sloped area first.

According to the autonomous lawn mowing system according to the invention of (17), since it is possible to cause the autonomous lawn mower to travel in the area that is not the sloped area first, it is possible to cause work to be performed for an area with a large slope angle later and move the autonomous lawn mower more safely.

Effects of the Invention

According to the present invention, it is possible to provide an autonomous lawn mowing system with improved safety.

BRIEF DESCRIPTION OF THE DRAWINGS

FIG. 3 is a schematic diagram of a table showing characteristics of each of working machines with scores;

FIG. 5 is a flowchart illustrating a control flow of the autonomous lawn mowing system shown in FIG. 1.

PREFERRED MODE FOR CARRYING OUT THE INVENTION

An embodiment according to the present invention will be described in detail below with reference to the drawings.

Figure 1:
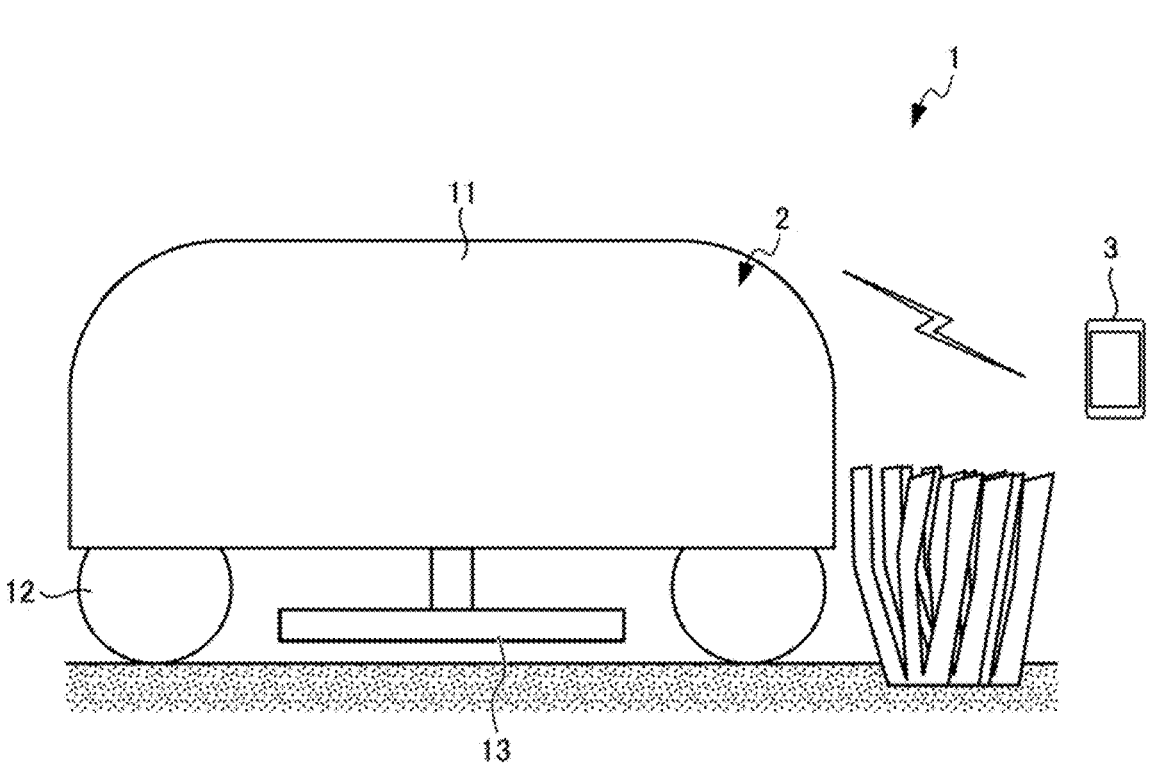
FIG. 1 is a schematic diagram of an autonomous lawn mowing system according to an embodiment of the present invention.
Figure 2:
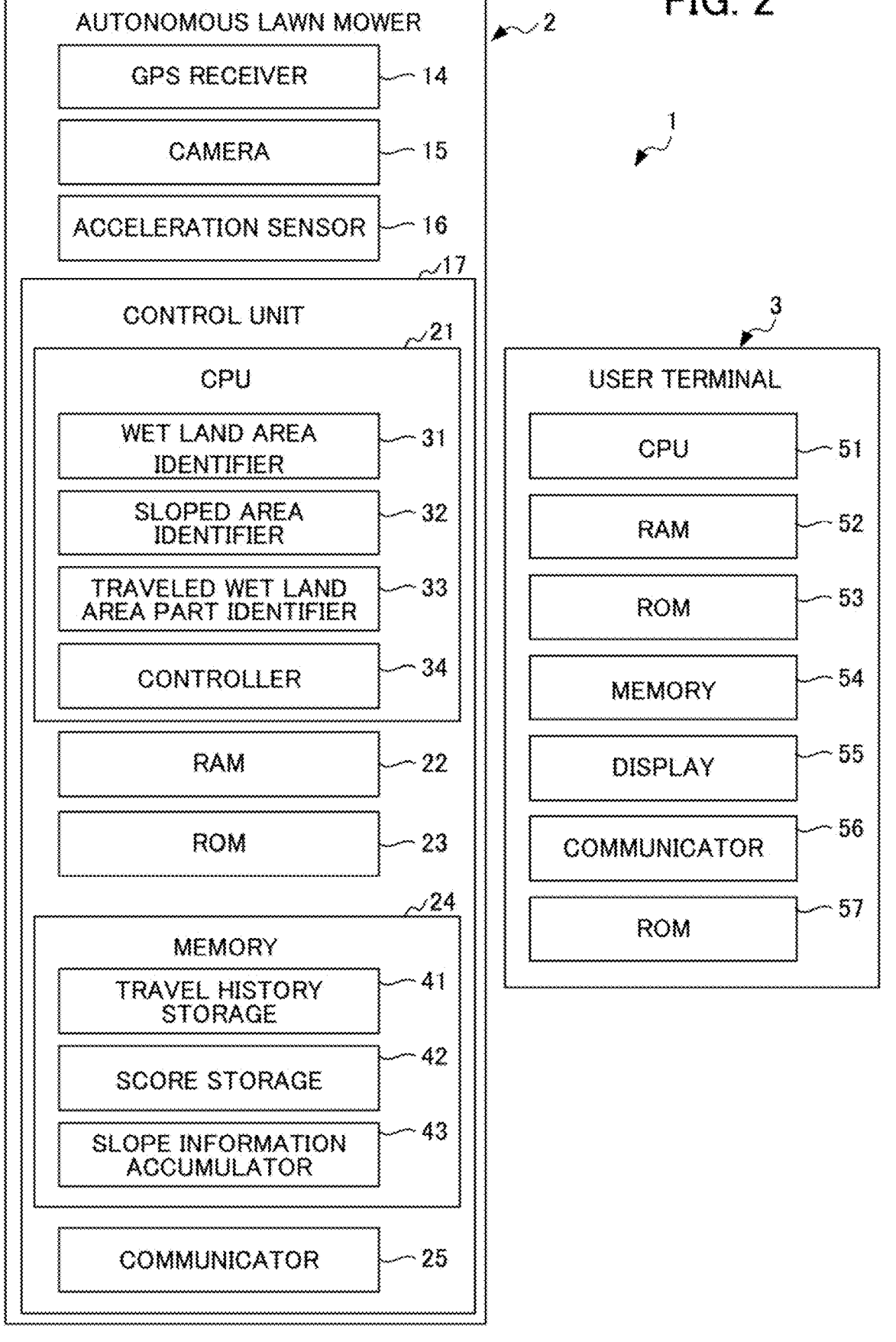
FIG. 2 is a block diagram of the autonomous lawn mowing system shown in FIG. 1.

First, a configuration of an autonomous lawn mowing system 1 according to the embodiment of the present invention will be described with FIGS. 1 and 2. FIG. 1 is a schematic diagram of the autonomous lawn mowing system 1. FIG. 2 is a block diagram of the autonomous lawn mowing system 1.

The autonomous lawn mowing system 1 is a system that controls a self-propelled autonomous lawn mower 2 according to a moisture content and a slope angle of a lawn and notifies a user terminal 3 of information about the moisture content and the slope angle of the lawn. The autonomous lawn mowing system 1 is used together with working machines that perform work on the lawn, such as a manual lawn mower and a manual blower. Specifically, the autonomous lawn mowing system 1 is provided with one or more autonomous lawn mowers 2, one or more user terminals 3, and the like.

The autonomous lawn mower 2 is provided with a lawn mower body 11, a plurality of wheels 12, a mowing blade 13, a GPS receiver (a position information acquirer) 14, a camera (a moisture information acquirer) 15, an acceleration sensor (a slope information acquirer) 16, a control unit 17, and the like.

The lawn mower body 11 constitutes a body of the autonomous lawn mower 2 and constitutes a case in which each unit is attached or included.

The plurality of wheels 12 are attached to four corners or the like at a lower part of the lawn mower body 11 and cause the autonomous lawn mower 2 to move forward or backward, or turn by rotating.

The mowing blade 13 is attached to a center at the lower part of the lawn mower body 11 and performs lawn mowing work by rotating.

The GPS receiver 14 acquires position information about a current position of the self-propelled autonomous lawn mower 2.

The camera 15 acquires, by photographing a lawn in front of or around the autonomous lawn mower 2, moisture information about a moisture content of the lawn.

The acceleration sensor 16 acquires, by measuring a tilt angle of the autonomous lawn mower 2, slope information about a slope angle of the lawn.

The control unit 17 is provided with a CPU 21, a RAM 22, a ROM 23, a memory 24, and a communicator (a transmitter) 25, and the like.

By executing various kinds of programs, the CPU (central processing unit) 21 realizes various kinds of functions of a wet land area identifier 31, a sloped area identifier 32, a traveled wet land area part identifier 33, a controller 34, and the like to comprehensively control the autonomous lawn mower 2.

The wet land area identifier 31 identifies a wet land area based on the position information acquired by the GPS receiver 14 and an image, which is the moisture information acquired by the camera 15. Specifically, the wet land area identifier 31 identifies a wet land area by determining whether an area is a wet land area or not by machine learning of an image photographed by the camera 15.

The sloped area identifier 32 identifies a sloped area with a slope angle equal to or more than a predetermined value, based on the position information acquired by the GPS receiver 14 and the slope information acquired by the acceleration sensor 16.

The traveled wet land area part identifier 33 identifies a traveled wet land area part, which is an area in a wet land area, where the autonomous lawn mower 2 has traveled, based on wet land area information, which is a result identified by the wet land area identifier 31, and a travel history of the autonomous lawn mower 2 stored in a travel history storage 41.

The controller 34 performs control of the autonomous lawn mower 2 based on a result identified by the wet land area identifier 31. The controller 34 performs control of the autonomous lawn mower 2 based on a result identified by the sloped area identifier 32.

For example, the controller 34 performs control of prohibiting the autonomous lawn mower 2 from traveling in an area that is a sloped area in a wet land area. In this case, the controller 34 performs control of permitting the autonomous lawn mower 2 to travel in an area that is not a sloped area in the wet land area. Or alternatively, the controller 34 performs control of prohibiting the autonomous lawn mower 2 from traveling in an entire area of the wet land area.

Further, when the autonomous lawn mower 2 is provided with a large-size autonomous lawn mower that is relatively large and a small-size autonomous lawn mower that is relatively small, the controller 34 may perform control of prohibiting the large-size autonomous lawn mower from traveling in an area that is a wet land area and is also a sloped area. In this case, the controller 34 may perform control of permitting the small-size autonomous lawn mower to travel in an area that is a wet land area but is not a sloped area. Furthermore, the controller 34 may perform control of prohibiting the large-size autonomous lawn mower from traveling in the entire area of the wet land area. Whether the large-size autonomous lawn mower or the small-size autonomous lawn mower may be inputted by a user or may be initially set.

Further, the controller 34 may perform control of the autonomous lawn mower 2 based on scores stored in a score storage 42. Description will be made, for example, on a case where the score is 7 when the autonomous lawn mower 2 is a large-size working machine, 3 when the autonomous lawn mower 2 is a small-size working machine, 3 for a manual lawn mower, and 2 for a manual blower (see FIG. 3). In this case, the controller 34 of the large-size autonomous lawn mower 2 with a high score may be adapted to perform control of prohibiting the autonomous lawn mower 2 from traveling in a sloped area in a wet land area, while the controller 34 of the autonomous lawn mower 2 with a low score may be adapted to perform control of permitting the autonomous lawn mower 2 to travel in a sloped area in a wet land area. Or alternatively, the controller 34 of the large-size autonomous lawn mower 2 with a high score may be adapted to perform control of prohibiting the autonomous lawn mower 2 from traveling in the entire area of the wet land area, while the controller 34 of the autonomous lawn mower 2 with a low score may be adapted to perform control of permitting the autonomous lawn mower 2 to travel in the entire area of the wet land area.

Furthermore, the controller 34 performs control of the autonomous lawn mower 2 based on information accumulated in a slope information accumulator 43.

The RAM (random access memory) 22 is used as a work area of the CPU 21.

The ROM (read only memory) 23 stores the various kinds of programs executed by the CPU 21.

The memory 24 functions as storage areas of the travel history storage 41, the score storage 42, the slope information accumulator 43, and the like.

The travel history storage 41 stores the travel history of the autonomous lawn mower 2.

The score storage 42 stores scores indicating characteristics of each of working machines that perform work on the lawn, including the autonomous lawn mower 2, as an information table (see FIG. 3).

The slope information accumulator 43 accumulates the slope information acquired by the acceleration sensor 16 in association with the position information acquired by the GPS receiver 14.

The communicator 25 performs wireless communication with the user terminal 3, for example, using a mobile communication system. Specifically, the communicator 25 transmits the wet land area information, which is the result identified by the wet land area identifier 31, and information about the traveled wet land area part identified by the traveled wet land area part identifier 33, to the user terminal 3.

The user terminal 3 is a terminal connected to the autonomous lawn mower 2 by wireless communication and has an input function of inputting various kinds of information and an output function of outputting various kinds of information. As the user terminal 3, a general-purpose machine such as a smartphone, a tablet terminal, or a laptop, or a dedicated terminal may be adopted.

Specifically, the user terminal 3 is provided with a CPU 51, a RAM 52, a ROM 53, a memory 54, a display (a display unit) 55, a communicator (a receiver) 56, a map information acquirer 57, and the like.

By executing various kinds of programs, the CPU (central processing unit) 51 realizes various kinds of functions to comprehensively control the user terminal 3.

The RAM (random access memory) 52 is used as a work area of the CPU 51.

The ROM (read only memory) 53 stores the various kinds of programs executed by the CPU 51.

The memory 54 stores various kinds of information.

The display 55 displays a map of the lawn based on map information acquired by the map information acquirer 57. The display 55 displays an area where the autonomous lawn mower 2 is prohibited from traveling, which is included in the wet land area information which is the result identified by the wet land area identifier 31, superimposing the area on the map of the lawn in such a manner that the area is distinguishable from other areas, and displays a traveled wet land area part identified by the traveled wet land area part identifier 33, superimposing the area on the map of the lawn in such a manner that the traveled wet land area part is distinguishable from other areas.

The communicator 56 performs wireless communication with the autonomous lawn mower 2, for example, using a mobile communication system. Specifically, the communicator 56 receives the wet land area information, which is the result identified by the wet land area identifier 31, and information about the traveled wet land area part identified by the traveled wet land area part identifier 33.

The map information acquirer 57 acquires information about the map of the lawn. As for the information, the latest information may be acquired through the Internet via the communicator 56, or information stored in the memory 54 may be acquired.

Next, the table showing characteristics of each of working machines with scores will be described with FIG. 3. FIG. 3 is a schematic diagram of the table showing characteristics of each of working machines with scores.

The table showing characteristics of each of working machines with scores, which is shown in FIG. 3, is stored in the score storage 42. In the table, "classification", "score based on size", "score based on with/without blade", "score based on traveling speed", "total score", and the like are associated with one another. For example, when the autonomous lawn mower 2 is a large-size working machine, the "score based on size" is 3, the "score based on with/without blade" is 1, the "score based on traveling speed" is 3, and the "total score" is 7. That is, when the autonomous lawn mower 2 is a large-size working machine, the score of its characteristics is 7.

Figure 4:
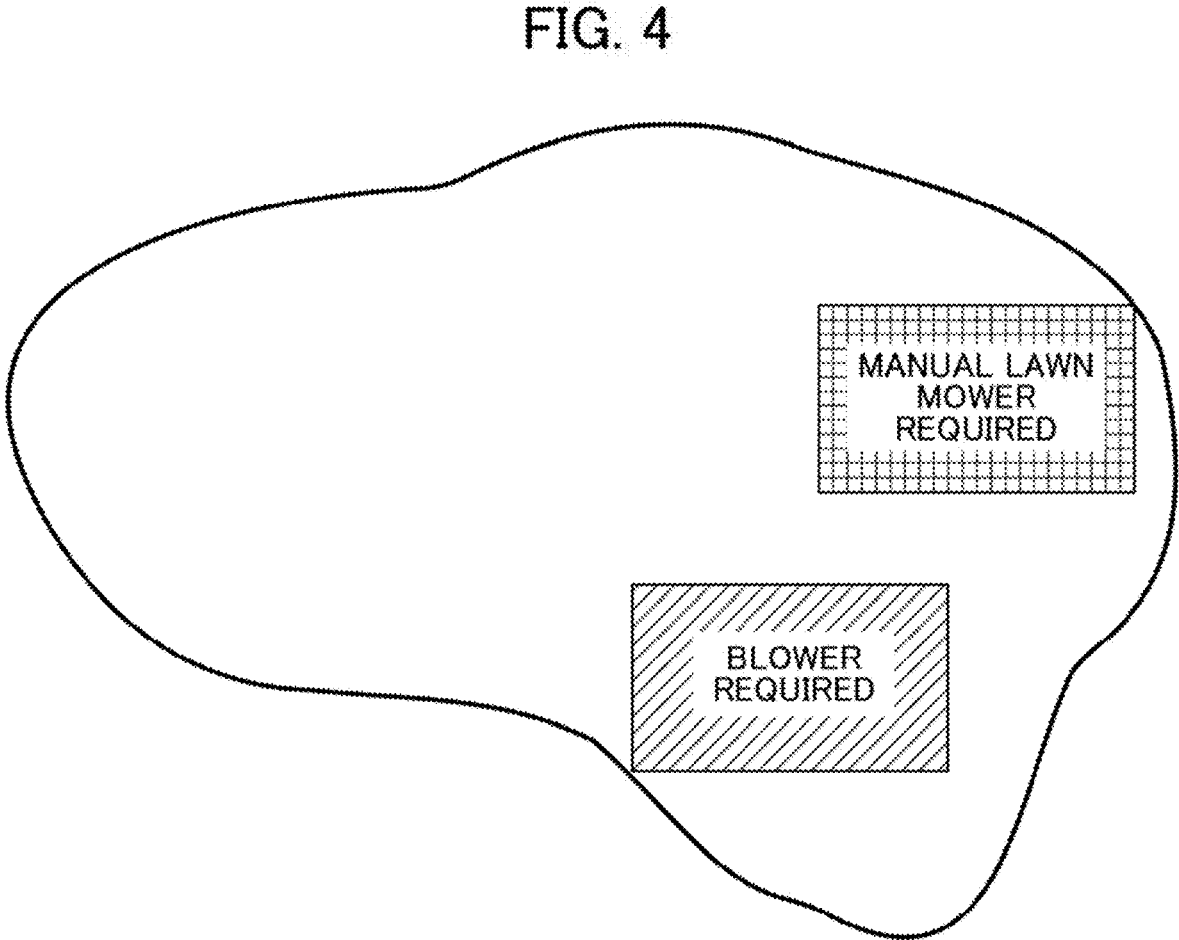
FIG. 4 is a schematic diagram of a user interface displayed on a display of a user terminal.

Next, a user interface displayed on the display 55 of the user terminal 3 will be described with FIG. 4. FIG. 4 is a schematic diagram of the user interface displayed on the display 55 of the user terminal 3.

As shown in FIG. 4, the map of the lawn is displayed on the display 55 based on the map information acquired by the map information acquirer 57.

Further, if an area where the autonomous lawn mower 2 is prohibited from traveling is included in the wet land area information, which is the result identified by the wet land area identifier 31, the area where the autonomous lawn mower 2 is prohibited from traveling is displayed on the display 55, being superimposed on the map of the lawn in such a manner that the area is distinguishable from other areas. It is preferable that, for the area where the autonomous lawn mower 2 is prohibited from traveling, for example, "Manual Lawn Mower Required" is displayed as characters notifying that work by a manual lawn mower is required.

Furthermore, when the traveled wet land area part identifier 33 identifies a traveled wet land area part, the traveled wet land area part is displayed on the display 55, being superimposed on the map of the lawn in such a manner that the traveled wet land area part is distinguishable from other areas. It is preferable that, for the traveled wet land area part, for example, "Blower Required" is displayed as characters notifying that work by a blower is required.

Figure 5:
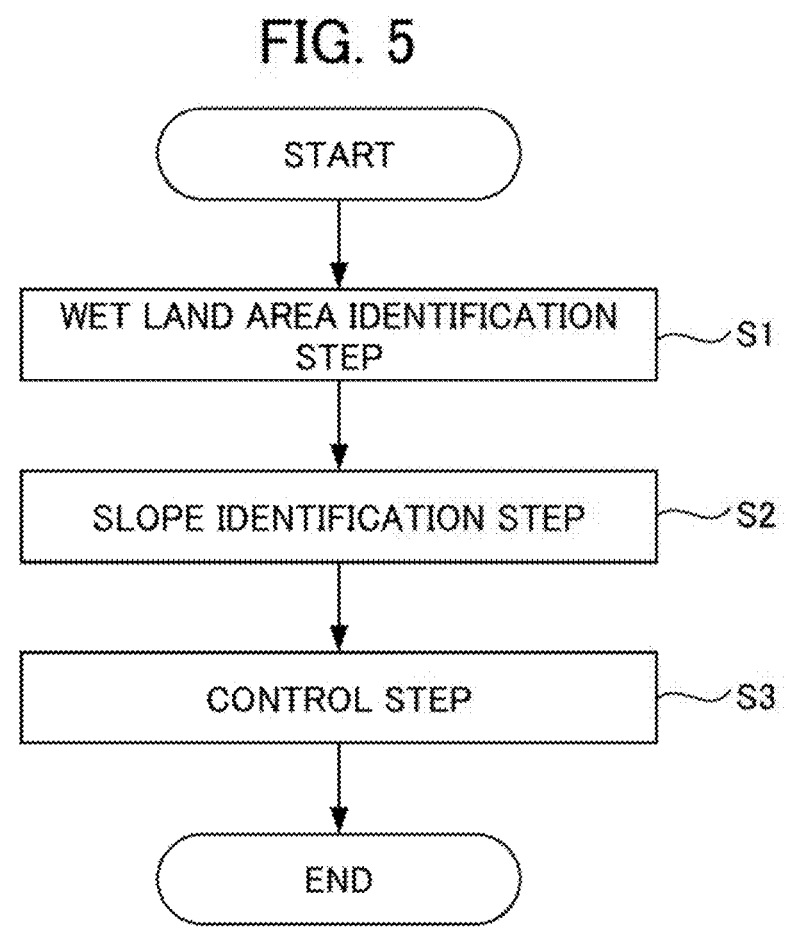

Next, a main control flow of the autonomous lawn mowing system 1 will be described with FIG. 5. FIG. 5 is a flowchart illustrating the main control flow of the autonomous lawn mowing system 1.

The autonomous lawn mowing system 1 is controlled according to the main control flow shown in FIG. 5. Specifically, the autonomous lawn mowing system 1 performs processes of a wet land area identification step S1, a slope identification step S2, a control step S3, and the like.

At the wet land area identification step S1, a learning model is constructed, for example, by supervised machine learning, with the position information acquired by the GPS receiver 14 and a plurality of images of the lawn, which is the moisture information acquired by the camera 15, as input images, and a wet land area is identified based on the learning model.

At the slope identification step S2, a sloped area is identified based on the position information acquired by the GPS receiver 14 and the slope information acquired by the acceleration sensor 16.

At the control step S3, control of the autonomous lawn mower 2 is performed based on the wet land area identified at the wet land area identification step S1 and the sloped area identified at the slope identification step S2.

The processes of the wet land area identification step S1 and the slope identification step S2 are not limited to the above order but may be performed in opposite order or at the same time. Further, the slope identification step S2 is not an indispensable step and may be omitted.

According to the autonomous lawn mowing system 1 as described above, it is possible to perform control of the autonomous lawn mower 2 according to whether an area is a wet land area or not. As a result, it is possible to move the autonomous lawn mower 2 safely.

Further, according to the autonomous lawn mowing system 1, it is possible to perform control of the autonomous lawn mower 2 according to whether an area is a sloped area or not. As a result, it is possible to move the autonomous lawn mower 2 more safely.

Further, according to the autonomous lawn mowing system 1, there may be a case where it is possible to prohibit an autonomous lawn mower 2 from traveling in an area that is a sloped area in a wet land area. In this case, it is possible to move the autonomous lawn mower 2 more safely.

Further, according to the autonomous lawn mowing system 1, there may be a case where it is possible to allow the autonomous lawn mower 2 to travel in an area that is not a sloped area in a wet land area. In this case, it is possible to move the autonomous lawn mower 2 more safely.

Further, according to the autonomous lawn mowing system 1, there may be a case where it is possible to prohibit the autonomous lawn mower 2 from traveling in the entire area of the wet land area. In this case, it is possible to move the autonomous lawn mower 2 more safely.

Further, according to the autonomous lawn mowing system 1, it is possible to notify the user of a wet land area. That is, it is possible to prompt the user to perform work by a manual lawn mower in the wet land area.

Further, according to the autonomous lawn mowing system 1, it is possible to visually notify the user of an area where it is not possible to perform work with the autonomous lawn mower 2.

Further, according to the autonomous lawn mowing system 1, it is possible to visually notify the user of an area where grass mowed by the autonomous lawn mower 2 may be left as wet clumps. That is, it is possible to prompt the user to perform work by a manual blower in the area.

Further, according to the autonomous lawn mowing system 1, since the camera 15 is provided as the moisture information acquirer, it is possible to acquire the moisture information about a moisture content of the lawn certainly and accurately with a simple structure.

Further, according to the autonomous lawn mowing system 1, it is possible to perform control of the autonomous lawn mower 2 according to scores indicating characteristics of the autonomous lawn mower 2. As a result, it is possible to move the autonomous lawn mower 2 more safely.

Further, according to the autonomous lawn mowing system 1, there may be a case where it is possible to prohibit the large-size autonomous lawn mower from traveling in an area that is a sloped area in a wet land area. In this case, even in a case where both of the large-size autonomous lawn mower and the small-size autonomous lawn mower are provided, it is possible to move the autonomous lawn mower 2 more certainly and safely.

Further, according to the autonomous lawn mowing system 1, there may be a case where it is possible to allow the small-size autonomous lawn mower to travel in an area that is not a sloped area in a wet land area. In this case, it is possible to move the small-size autonomous lawn mower safely in an area that is not a sloped area in a wet land area and make the work more efficient.

Further, according to the autonomous lawn mowing system 1, there may be a case where it is possible to prohibit the large-size autonomous lawn mower from traveling in the entire area of the wet land area. In this case, it is possible to avoid the possibility of the large-size autonomous lawn mower slipping in a wet land area more certainly.

Further, according to the autonomous lawn mowing system 1, it is possible to perform control of the autonomous lawn mower 2 based on the slope information associated with the position information. For example, it is possible to cause work to be performed for an area with a small slope angle first and cause work to be performed for an area with a large slope angle later. As a result, it is possible to move the autonomous lawn mower 2 more safely.

The present invention is not limited to the above embodiment, and modifications, improvements, and the like are included in the present invention as far as the object of the present invention is achieved.

For example, though description has been made on the case where a wet land area is identified by machine learning of images photographed by the camera 15 as an example in the embodiment, the present invention is not limited thereto. A wet land area may be identified by a measurement result of a humidity sensor provided in the autonomous lawn mower 2 or a plurality of humidity sensors installed on a lawn. In such cases, the humidity sensor/sensors functions/ function as a moisture information acquirer that acquires moisture information about a moisture content of the lawn. In this case, for example, it may be determined whether or not the moisture content or a moisture percentage is equal to or above a threshold, and the area may be identified as a wet land area if the moisture content or the moisture percentage is equal to or above the threshold. Even in this case, it is possible to acquire the moisture information about the moisture content of the lawn certainly and accurately with a simple structure.

EXPLANATION OF REFERENCE NUMERALS 1 autonomous lawn mowing system
2 autonomous lawn mower
3 user terminal
11 lawn mower body
12 wheel
13 mowing blade
14 GPS receiver (position information acquirer)
15 camera (moisture information acquirer)
16 acceleration sensor (slope information acquirer)
17 control unit
21 CPU
22 RAM
23 ROM
24 memory
25 communicator (transmitter)
31 wet land area identifier
32 sloped area identifier
33 traveled wet land area part identifier
34 controller
41 travel history storage
42 score storage
43 slope information accumulator
51 CPU
52 RAM
53 ROM
54 memory
55 display (display unit)
56 communicator (receiver)
57 map information acquirer
S1 wet land area identification step
S2 slope identification step
S3 control step

The invention claimed is:

1. An autonomous lawn mowing system comprising:
a GPS receiver configured to acquire position information about a position of a self-propelled autonomous lawn mower;
a moisture information acquirer including any one of a camera, a humidity sensor provided in the autonomous lawn mower, or a plurality of humidity sensors installed in a lawn, each configured to acquire moisture information about a moisture content of the lawn;
a score storage that stores a table in which a classification of each working machines is associated with scores indicating characteristics of each working machine, the characteristics including at least one of the size of the working machine, whether or not the working machine has a blade, and a traveling speed; and
a processor configured to:
identify a wet land area based on the position information and the moisture information;
prohibit or permit travel of the autonomous lawn mower in the identified wet land area based on a total score of the scores indicating the characteristics associated with the classification stored in the score storage corresponding to the autonomous lawn mower.

2. The autonomous lawn mowing system according to claim 1, further comprising:
an acceleration sensor configured to acquire slope information about a slope angle of the lawn, and
wherein the processor is configured to:
identify a sloped area with a slope angle equal to or more than a predetermined value, based on the position information and the slope information, and
control the autonomous lawn mower based on the identified sloped area.

3. The autonomous lawn mowing system according to claim 2, wherein the processor is configured to prohibit the autonomous lawn mower from traveling in an area that is included in both the wet land area and the sloped area.

4. The autonomous lawn mowing system according to claim 2, wherein the processor is configured to allow the autonomous lawn mower to travel in an area that is included in the wet land area but is not included in the sloped area.

5. The autonomous lawn mowing system according to claim 1, wherein the processor is configured to prohibit the autonomous lawn mower from traveling in an entire area of the wet land area.

6. The autonomous lawn mowing system according to claim 1, comprising a transmitter that transmits wet land area information showing the wet land area, to a user terminal.

7. The autonomous lawn mowing system according to claim 6, wherein
the user terminal comprises:
a map information acquirer that acquires map information about a map of the lawn;
a receiver that receives the wet land area information; and
a display unit that displays the map of the lawn based on the map information and displays an area where the autonomous lawn mower is prohibited from traveling, superimposing the area on the map of the lawn in such a manner that the area is distinguishable from other areas, the area being included in the wet land area information.

8. The autonomous lawn mowing system according to claim 7, further comprising:
a travel history storage that stores a travel history of the autonomous lawn mower in association with the position information, and
the processor is further configured to identify a traveled wet land area part that is an area included in the wet land area and is an area where the autonomous lawn mower has traveled, based on the wet land area information and information stored in the travel history storage, wherein
the transmitter transmits information about the traveled wet land area part to the user terminal,
the receiver receives the information about the traveled wet land area part, and
the display unit displays the traveled wet land area part, superimposing the traveled wet land area part on the map of the lawn in such a manner that the traveled wet land area part is distinguishable from other areas.

9. The autonomous lawn mowing system according to claim 1, wherein
the moisture information acquirer is a camera that photographs the lawn, and the processor is configured to identify the wet land area by machine learning of an image photographed by the camera.

10. The autonomous lawn mowing system according to claim 1, further comprising:

a slope information accumulator that accumulates the slope information in association with the position information, wherein the processor is configured to control the autonomous lawn mower based on information accumulated in the slope information accumulator.

11. The autonomous lawn mowing system according to claim 10, wherein the processor is configured to cause the autonomous lawn mower to travel in an area that is not included in the sloped area first.

* * * * *